United States Patent [19]
Elster et al.

[11] Patent Number: 5,800,941
[45] Date of Patent: Sep. 1, 1998

[54] ELECTROCHEMICAL CELL

[75] Inventors: Esther Elster, Kfar Saba; Herzel Yamin, Rehovot, both of Israel

[73] Assignee: Tadiran Ltd., Holon, Israel

[21] Appl. No.: 643,920

[22] Filed: May 7, 1996

[30] Foreign Application Priority Data

May 7, 1995 [IL] Israel ......................... 113641

[51] Int. Cl.$^6$ ........................................ H01M 4/66
[52] U.S. Cl. .................. 429/105; 429/101; 429/208; 429/245; 429/196
[58] Field of Search ......................... 429/101, 105, 429/208, 245, 196

[56] References Cited

U.S. PATENT DOCUMENTS

| | | | |
|---|---|---|---|
| 3,655,535 | 4/1972 | Ruehlen et al. | 204/59 |
| 3,676,324 | 7/1972 | Mills | 204/284 |
| 4,052,535 | 10/1977 | Robinson et al. | 429/104 |
| 4,293,622 | 10/1981 | Marincic et al. | 429/50 |
| 4,900,588 | 2/1990 | Tajima et al. | 427/122 |
| 4,960,655 | 10/1990 | Hope et al. | 429/245 |
| 4,997,730 | 3/1991 | Morigaki et al. | 429/101 |
| 4,999,262 | 3/1991 | Prince | 429/245 |
| 5,260,855 | 11/1993 | Kaschmitter et al. | 361/502 |

*Primary Examiner*—Prince Willis, Jr.
*Assistant Examiner*—Carol Chaney
*Attorney, Agent, or Firm*—McDermott, Will & Emery

[57] ABSTRACT

An electrochemical cell and method for producing same. The cell includes a metal anode, a non aqueous liquid cathode solution, an electrolyte dissolved in the non aqueous liquid cathode solution, a porous carbon current collector, a separator disposed between said anode and said porous carbon current collector, and a non-porous current collector disposed adjacent the porous current collector for conducting current from the porous current collector to the cell pole, the non-porous current collector being characterized in that its surface adjacent the porous current collector is made essentially of non-porous carbon.

20 Claims, 2 Drawing Sheets

ELECTROCHEMICAL CELL

FIELD OF THE INVENTION

The present invention relates to electrochemical cells generally and more particularly to non aqueous active metal electrochemical cells.

BACKGROUND OF THE INVENTION

Non aqueous active metal electrochemical cells, in particular non aqueous active metal electrochemical cells in which the cathode is in a liquid state, are well known in the art. These cells typically include a metal anode adhered to the cell can and an oxidizing liquid which forms the cell cathode in which an electrolyte salt is dissolved. The term electrolyte refers herein to the salt dissolved in the liquid solution which forms the liquid cathode.

The liquid cathode typically fills a porous carbon current collector from which current is collected by a metal current collector, typically a stainless steel, nickel or nickel plated steel metal current collector. The metal current collector conducts the current from the porous current collector to an external lead which forms the cell positive pole.

One drawback of prior art non aqueous liquid cathode cells is that their performance, i.e. the output current which they provide, deteriorates with increasing temperature due to a passivation of the metal current collector.

SUMMARY OF THE INVENTION

It is an object of the present invention to provide an improved electrochemical cell.

It is another object of the present invention to provide an improved bobbin type electrochemical cell.

It is yet another object of the present invention to provide an electrochemical cell which provides high continuous current and high pulsed current in relatively high temperatures and maintains substantially high and uniform voltage output over a relatively large range of temperatures.

The present inventors have realized that by providing an essentially non-porous carbon current collector or a metal current collector plated by a layer of non-porous carbon, an improved electrochemical cell is obtained.

According to one aspect of the present invention, there is provided an electrochemical cell comprising: a metal anode, a non-aqueous liquid cathode solution, an electrolyte dissolved in the non-aqueous liquid cathode solution, current collector means for collecting and conducting current generated by the cell to a pole of the cell; and a separator between the anode and the current collector means; characterized in that said current collector means comprises a porous carbon current collector filled with the non-aqueous liquid cathode solution having the electrolyte dissolved therein; a metal support electrically connected to the pole of the cell; and a layer of non-porous carbon on the metal support in direct contact with the porous carbon current collector.

Further, according to a preferred embodiment of the present invention, the non-porous current collector includes a metal support and a film of non-porous carbon plated on the surface thereof wherein the thickness of the film ranges between 50–10,000 angstroms.

In accordance with a preferred embodiment of the present invention, the carbon film is deposited by vapor deposition.

Alternatively, according to a preferred embodiment of the present invention, the non-porous current collector includes a metal support sandwiched between two non-porous carbon foils.

In accordance with a preferred embodiment of the present invention, the metal support is a metal screen or a metal foil selected from the group consisting of stainless steel, nickel and nickel plated steel.

Further, the porosity of the non-porous carbon is less than 50 percent.

Still Further, according to a preferred embodiment of the present invention, the liquid cathode solution is formed essentially of an oxyhalide solution and is preferably selected from the group consisting of $SO_2Cl_2$ and $SOCl_2$.

Still further, according to a preferred embodiment of the present invention, the metal anode is essentially made of lithium and the cell is a bobbin type cell.

According to another aspect of the present invention, there is provided a method of producing an electrochemical cell comprising: assembling In a cell housing a metal anode, a non-aqueous liquid cathode solution, a porous carbon current collector, a separator between the anode and the porous carbon current collector, and a metal current collector for conducting current from the porous current collector to a pole of the cell; characterized in providing a layer of nonporous carbon on the metal current collector in direct contact with the porous carbon current collector.

Further, according to a preferred embodiment of the present invention, the method includes the step of forming the non-porous current collector from a metal support and a film of non-porous carbon plated on the surface thereof.

Still further, according to a preferred embodiment of the present invention, the method includes the step of forming the film with a thickness which ranges between 50–10,000 angstroms.

According to a preferred embodiment of the present invention, the method include the step of forming the non-porous carbon film by vapor deposition.

Alternatively, according to a preferred method of the present invention, the method may include the step of forming the non-porous current collector from a metal support sandwiched between two non-porous carbon foils.

According to a preferred embodiment of the present invention, the method includes the step of forming the metal support as a metal screen selected from the group consisting of stainless steel, nickel and nickel plated steel.

Additionally, in accordance with a preferred embodiment of the present invention, the method may include the step of forming the non-porous current collector from a non-porous carbon having a porosity of less than 50 percent.

Further, according to a preferred embodiment of the present invention, the method includes the step of forming the liquid cathode solution essentially of an oxyhalide solution which is preferably selected from the group consisting of $SO_2Cl_2$ and $SOCl_2$.

Finally, in accordance with a preferred embodiment of the present invention, the method also include the step of forming the metal anode essentially of lithium and may also include the step of forming the cell as a bobbin type cell.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
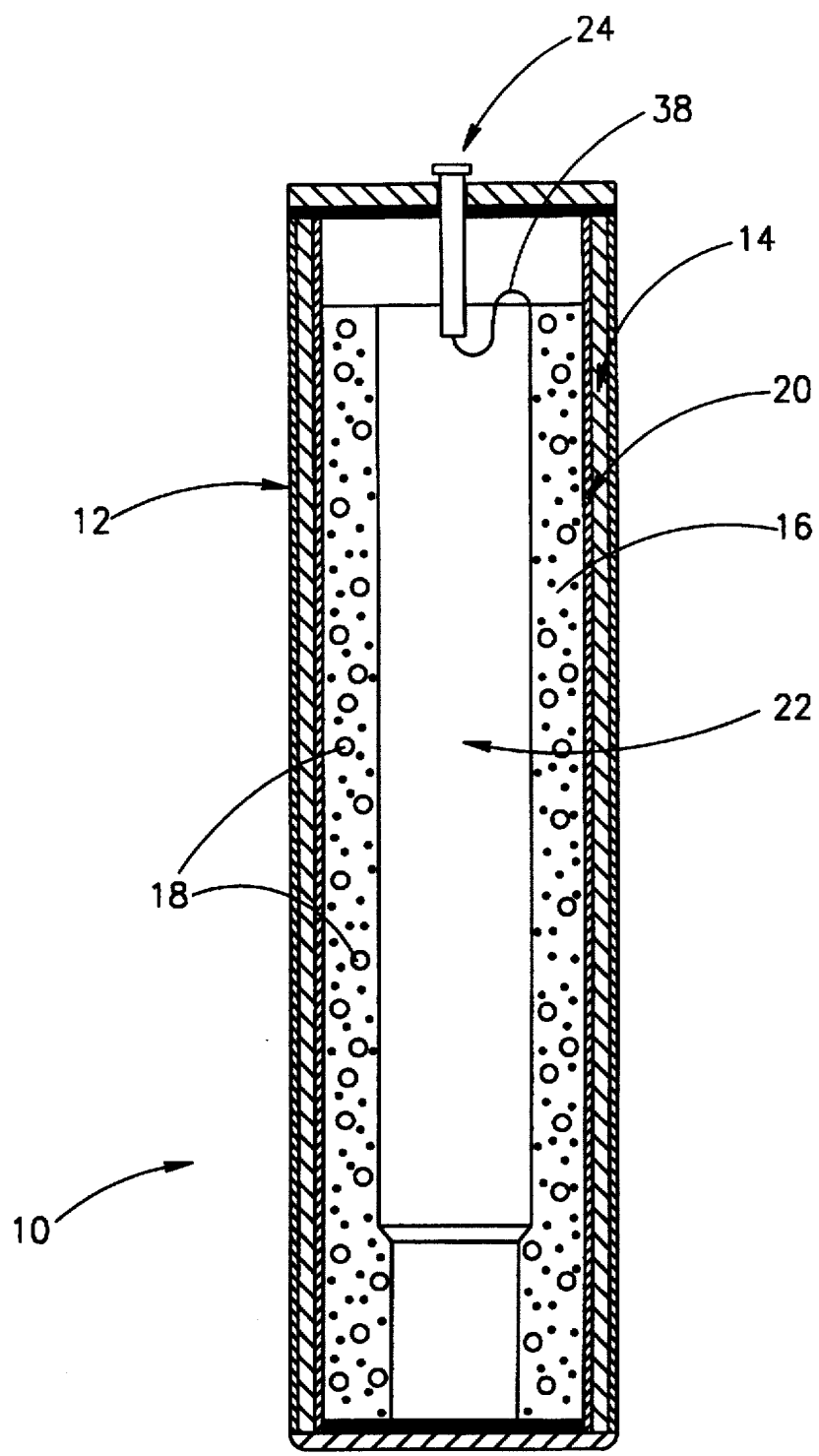
FIG. 1 is a schematic cross section illustration of an electrochemical cell, constructed and operative in accordance with a preferred embodiment of the present invention.

Reference is now made to FIG. 1 which is a schematic cross section illustration of an electrochemical cell, constructed and operative in accordance with a preferred embodiment of the present invention.

The cell of FIG. 1, generally referenced 10, preferably comprises a cell can 12 on the inner side of which a lithium foil 14 is adhered, a porous carbon current collector 16 having a large surface area on which a liquid solution which forms the cell cathode 18 reacts to provide the cell current, a separator 20 which separates the anode 14 from the porous carbon current collector 16 and a non-porous carbon current collector, generally referenced 22. The non-porous carbon current collector 22 conducts current from the porous carbon current collector to the cell positive pole 24 via metal conductor 38.

The separator 20 may be any suitable separator, such as a glass fiber separator or an alumina based separator. The liquid solution 18 which forms the liquid cathode solution may be any suitable non aqueous solution and preferably an oxyhalide solution, such as sulfuryl chloride ($SO_2Cl_2$) or thionyl chloride ($SOCl_2$) solution or a mixture thereof. Any suitable electrolyte salt, such as $LiAlCl_4$ or $LiGaCl_4$. is dissolved in the liquid cathode solution 18.

It will be appreciated that the term electrolyte refers herein to the salt dissolved in the liquid cathode solution 18.

Figure 2:
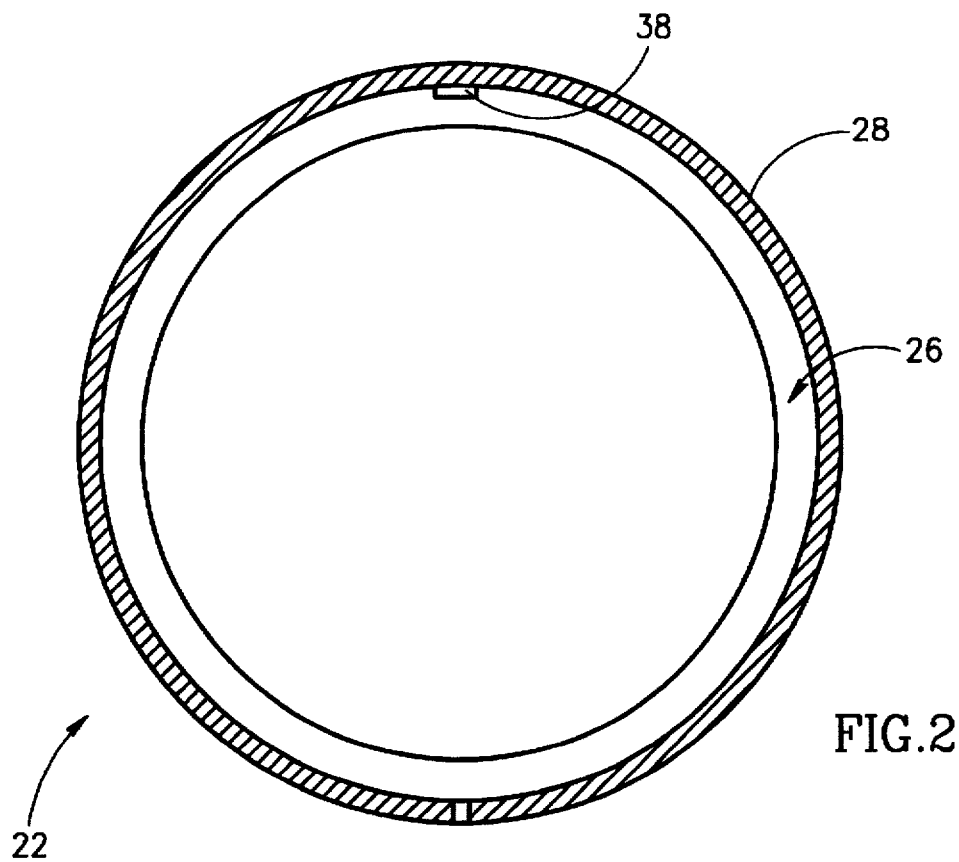
FIG. 2 is a schematic top view illustration of the non-porous carbon current collector, constructed and operative in accordance with a preferred embodiment of the present invention.

According to one preferred embodiment of the present invention, as shown in FIG. 2 to which reference is now made, the non-porous carbon current collector 22 is any prior art metal current collector on which a film of non-porous carbon is plated by any suitable vapor deposition technique, such as by vacuum deposition.

The non-porous carbon current collector 22 preferably comprises a cylindrically shaped hollow metal tube 26 (FIG. 2), on which a carbon film 28 of a typical thickness ranging from several tens of angstroms to few thousand angstroms is plated by vacuum deposition.

It will be appreciated that the thickness of the film 28 is highly exaggerated for illustration purposes only and that the current collector hollow metal tube 26 is much thicker than the film 28.

Figure 3:
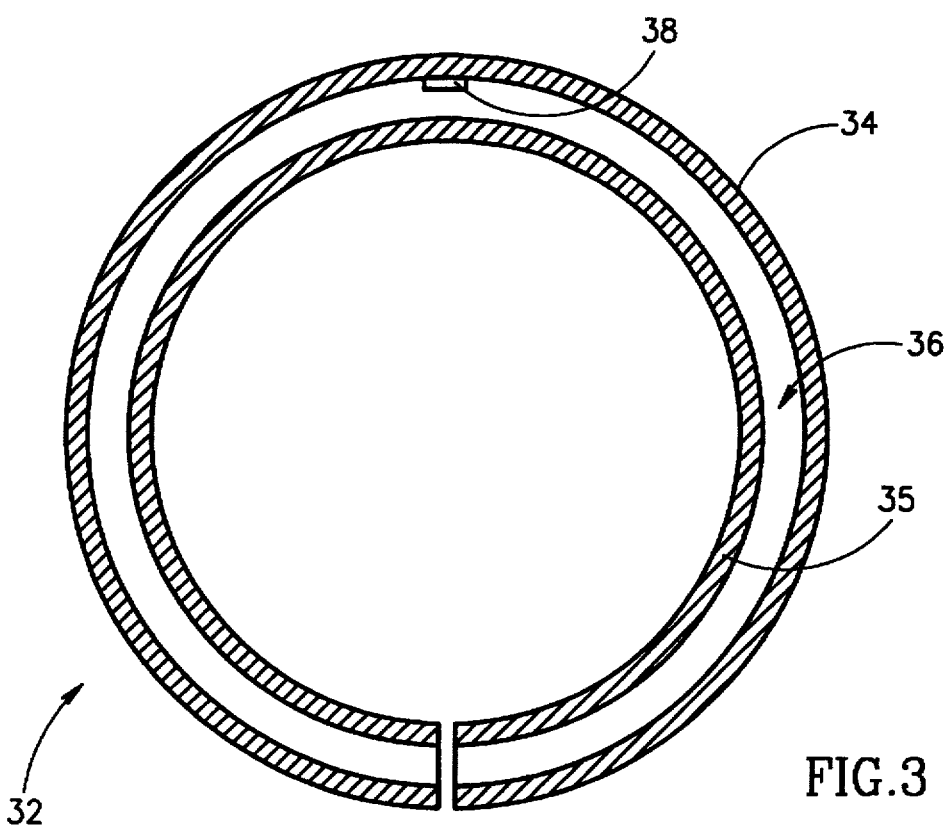
FIG. 3 is a schematic top view illustration of the non-porous carbon current collector, constructed and operative in accordance with an alternative preferred embodiment of the present invention.

Reference is now made to FIG. 3 which is a schematic top view illustration of a non-porous carbon current collector, constructed and operative in accordance with an alternative preferred embodiment of the present invention. The non-porous carbon current collector of FIG. 3, generally referenced 32, is formed from two carbon foils, referenced 34 and 35 and a metal support 36 sandwiched therebetween. The metal support 36 is preferably a metal screen 36 made of any suitable material, such as stainless steel, nickel or nickel plated steel. The carbon foils 34 and 35 and the metal screen 36 are rolled together, and form a shape of a hollow cylindrical tube the surfaces of which are made of non-porous carbon. The porosity of the non-porous foils 34 and 35 is typically less than 50 percent.

It will be appreciated that both the current collectors 22 and 32 preferably also comprise a metal conductor 38 extending therefrom and contacting the positive pole 24 therewith.

It is a particular feature of the present invention, that unlike prior art cells, the outer surface of the non-porous current collector 22, i.e. the surface in contact with the porous carbon current collector 16, is formed of non-porous carbon.

The cell 10 provides high currents over a wide range of temperatures as shown in the following non limiting examples:

EXAMPLE 1

A DD size cell as illustrated in FIG. 1 has been fabricated with a lithium anode, sulfuryl chloride with $LiAlCl_4$ electrolyte and a nickel current collector plated with a carbon film of 1000 Angstroms as the non-porous current collector.

The cell of this type has been discharged in pulses of 850 mA with a duty cycle of 12% at room temperature (RT), 90° C. and 150° C. The cells performance in these temperatures was as follows:

At RT the cell provided 20 Ah with an average pulse voltage of 3.4 volts;

At 90° C. the cell provided 21 Ah with an average pulse voltage of 3.4 volts;

At 150° C. the cell provided 24 Ah with an average pulse voltage of 3.4 volts;

Comparative Example

A cell was fabricated as in example 1 but with a nickel current collector not plated with a carbon film. The cell has been discharged at 150° C. under similar conditions as the cell of example 1 and provided 0.5 Ah with an average pulse voltage of 2 volts.

EXAMPLE 2

A cell was fabricated as in example 1 with a non-porous current collector made of a 0.2 mm thick graphite having a nickel support net therein.

The cell of this type has been discharged in pulses of 850 mA with a duty cycle of 12% at room temperature (RT), 90° C. and 150° C. The cell's performance at these temperatures was as follows:

At RT the cell provided 21 Ah with an average pulse voltage of 3.2 volts;

At 90° C. the cell provided 16 Ah with an average pulse voltage of 3.5 volts;

At 150° C. the cell provided 20 Ah with an average pulse voltage of 3.4 volts.

It will be appreciated that the cell of the present invention is not limited to pulsed discharge and is advantageous also in continuous discharge as shown from the non limiting examples hereinbelow.

EXAMPLE 3

A cell as in example 1, was discharged in a continuous current of 1 A (about 10 $mA/cm^2$) at a temperature of 150° C. The cell provided 24 Ah with an average working voltage of 3.4 V.

It will be appreciated that the present invention is not limited to DD size cells as shown by way of example for the C size cell described hereinbelow.

EXAMPLE 4

A cell (C size) as in example 1 was discharged in a continuous current of 100 mA (about 3.5 $mA/cm^2$). At 150° C. the cell discharged 6.0 Ah with a working voltage of 3.7 volts.

Comparative Example

A cell as in example 4 without carbon plate on the nickel collector was discharged under similar conditions to those of example 4, to provide 6.0 Ah but with a working voltage of 2.6 volts.

EXAMPLE 5

A cell as in example 4 was discharged in pulses of 250 mA (about 8 mA/cm$^2$) at 150° C. and provided 6.1 Ah with a pulse voltage of 3.5 volts.

It will also be appreciated that the cell of the present invention is not limited to any of the cells described above and that many modifications, few of which are shown by way of example provide a cell which is advantageous with respect to prior art cells.

EXAMPLE 6

A cell as in example 2 but with a stainless steel support net instead of the nickel net. The cell was discharged in a continuous current of 1 A (about 10 mA/cm$^2$) and provided 18 Ah with a working voltage of 3.3 volts at 150° C.

EXAMPLE 7

A cell as in example 1 with a carbon film of 2000 Angstroms instead of 1000 Angstroms. The cell was discharged in a continuous current of 1 A (about 10 mA/cm$^2$) and provided 24 Ah with a working voltage of 3.4 volts at 150° C.

EXAMPLE 8

A cell as in example 1 with a solvent ratio of 80% by volume sulfuryl chloride and 20% by volume thionyl chloride. The cell was discharged in pulses of 850 mA and provided 23 Ah with an average pulse voltage of 3.3 volts at 150° C.

EXAMPLE 9

A cell as in example 4 with a LiGaCl$_4$ salt was fabricated. The cell was discharged in pulses of 250 mA and provided 6.0 Ah with an average pulse voltage of 3.2 volts at 150° C.

It will be appreciated that the present invention is not limited by what has been described hereinabove and that numerous modifications, all of which fall within the scope of the present invention, exist. For example, while the present invention has been described with respect to a bobbin type cell it is equally applicable to spiral wound type cells.

We claim:

1. An electrochemical cell comprising:

a metal anode;

a non-aqueous liquid cathode solution;

an electrolyte dissolved in said non-aqueous liquid cathode solution;

a current collector for collecting and conducting current generated by said cell to a pole of said cell;

and a separator between said anode and said current collector;

characterized in that said current collector comprises:

a porous carbon current collector filled with said non-aqueous liquid cathode solution having said electrolyte dissolved therein;

a metal support electrically connected to said pole of the cell;

and a layer of non-porous carbon on said metal support in direct contact with said porous carbon current collector, wherein said cathode solution is essentially an oxyhalide solution.

2. An electrochemical cell according to claim 1 wherein said layer of non-porous carbon is a film on the surface of said metal support.

3. An electrochemical cell according to claim 2 wherein the thickness of said film ranges between 50–10,000 angstroms.

4. An electrochemical cell according to claim 1 wherein said layer of non-porous carbon is a foil.

5. An electrochemical cell according to claim 4 wherein said metal support is a metal screen selected from the group consisting of stainless steel, nickel and nickel plated steel.

6. An electrochemical cell according to claim 1 wherein the porosity of said non-porous carbon layer is less than 50 percent.

7. An electrochemical cell according to claim 1 wherein said oxyhalide solution is selected from the group consisting of SO$_2$Cl$_2$, SOCl$_2$ and a mixture thereof.

8. An electrochemical cell according to claim 1 wherein said metal anode is formed essentially of lithium.

9. An electrochemical cell according to claim 1 wherein said cell is a bobbin cell.

10. A method of producing an electrochemical cell comprising: assembling in a cell housing a metal anode, a non-aqueous liquid cathode solution, a porous carbon current collector, a separator between said anode and said porous carbon current collector, and a metal current collector for conducting current from said porous current collector to a pole of said cell; characterized in providing a layer of non-porous carbon on said metal current collector in direct contact with said porous carbon current collector, wherein said cathode solution is essentially an oxyhalide solution.

11. A method according to claim 10, wherein said layer of non-porous carbon is applied as a film on said metal current collector.

12. A method according to claim 11 comprising, forming said film with a thickness which ranges between 50–10,000 angstroms.

13. A method according to claim 10, wherein said layer of non-porous carbon is applied as a foil to opposite sides of said metal current collector.

14. A method according to claim 13 wherein said metal current collectors formed as a metal screen selected from the group consisting of stainless steel, nickel and nickel plated steel.

15. A method according to claim 10 wherein said collector from non-porous carbon has a porosity of less than 50 percent.

16. A method according to claim 10 wherein said oxyhalide solution is selected from the group consisting of SO$_2$Cl$_2$ and SOCl$_2$.

17. A method according to claim 10 wherein said metal anode essentially is of lithium.

18. A method according to claim 10 wherein said cell as is a bobbin cell.

19. A method according to claim 11 wherein said non-porous carbon film is formed by vapor deposition.

20. A method according to claim 9 wherein said non-porous carbon film is formed by vacuum deposition.

* * * * *